（12）United States Patent
Copeland et al.

(10) Patent No.: US 6,304,196 B1
(45) Date of Patent: Oct. 16, 2001

(54) DISPARITY AND TRANSITION DENSITY CONTROL SYSTEM AND METHOD

(75) Inventors: Greg Copeland, Plano, TX (US); Bertan Tezcan, Sunnyvale, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 0 days.

(21) Appl. No.: 09/692,602

(22) Filed: Oct. 19, 2000

(51) Int. Cl.$^7$ ................................................ H03M 7/00
(52) U.S. Cl. ............................ 341/58; 341/50; 708/400; 708/410
(58) Field of Search ..................... 341/58, 50; 708/410, 708/400

(56) References Cited

U.S. PATENT DOCUMENTS 4,238,984 * 12/1980 Watanabe ................................ 84/608
4,446,530 * 5/1984 Tsuboka ................................ 708/100
5,311,176 * 5/1994 Gurney ................................... 341/50
5,726,925 * 3/1998 Hyun et al. ........................... 708/410

OTHER PUBLICATIONS

Richard F. Lyon, "Two–Level Block Encoding for Digital Transmission", *IEEE Transaction On Communications*, pp. 1438–1441 (Dec. 1973).

A.X. Widmer and P.A. Franaszek, "A DC–Balanced, Partitioned–Block, 8B/10B Transmission Code", *IBM J. Res. Develop*, pp. 440–451 (Sep. 1983).

* cited by examiner

Primary Examiner—Howard L. Williams
Assistant Examiner—Jean Bruner Jeanglaude
(74) Attorney, Agent, or Firm—Skjerven Morrill MacPherson, LLP

(57) ABSTRACT

A system and method for encoding and decoding data utilizes Walsh-Hadamard Transforms and inversion techniques to generate the possible minimum disparity values for the data to be encoded. A minimum disparity value is then selected that also provides sufficient transition density.

24 Claims, 7 Drawing Sheets

DISPARITY AND TRANSITION DENSITY CONTROL SYSTEM AND METHOD

CROSS-REFERENCE TO THE ATTACHED APPENDIX

Appendix A (which is part of the present disclosure as a paper appendix and will be converted to a microfiche appendix prior to the issuance of a patent) is attached herewith and incorporated herein by reference in its entirety. Appendix A contains listings of computer programs and related data including the software source code for implementing an embodiment of the invention as described more completely below.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to communication systems and, more particularly, to systems and methods for signal encoding and decoding.

2. Related Art

A typical communication system employs signal encoding and decoding to achieve many significant advantages such as efficient data transmission, error correction, combating channel interference, or ensuring communication secrecy. One example of an encoder is an 8 bit to 10 bit encoder (also referred to as an 8B/10B encoder) that encodes the incoming data with certain characteristics such as run length, transition density, and direct current (DC) balance. Run length refers to the number of identical contiguous symbols permitted at the encoder output. Transition density refers to the number of symbol changes (i.e., transitions from one symbol to the other symbol) for a given number of symbols, with a minimum number generally necessary for receiver synchronization. DC balance refers to providing an approximately equal number of binary ones and zeros, which for example, correspond to respective positive and negative values to allow for alternating current (AC) coupling. The characteristics above are related as, for example, a large number of contiguous binary ones would produce a large positive DC signal and run length, but no transitions.

It is generally desirable to have codes that are efficient (i.e., a large ratio of information digits per word to word length). Conventional encoders, such as the 8B/10B encoder, do generally eliminate disparity, which is the difference between the number of binary ones and zeros in a given block of data, or the DC component of the signal and also provide sufficient transition density. One drawback, however, is that these encoders are not very efficient. For example, the 8B/10B encoder operates at the byte level by taking 8 bits to provide an encoded output of 10 bits. Consequently, the 8B/10B encoder adds two additional bits for every eight bits resulting in an overhead of twenty percent. This inefficiency or additional overhead results in associated delays and costs such as increased transmission times, storage space, and overall channel capacity and bandwidth.

As a result, there is a need for a more efficient signal encoder and decoder while still providing desirable characteristics such as low disparity and sufficient transition density.

SUMMARY OF THE INVENTION

In accordance with some embodiments of the present invention, an efficient signal encoder and decoder is provided that requires less overhead than conventional signal encoders and decoders. The signal encoder/decoder of the present invention minimizes disparity or DC value of a data frame (i.e., block of data) and ensures sufficient transition density by employing Walsh-Hadamard transform techniques. The size of the data frame is scalable such as, for example, frame sizes corresponding to powers of 2 (e.g., 2, 4, 8, and 16) or three times a power of two.

In accordance with an embodiment of the present invention, a data encoding apparatus comprises at least one disparity counter that calculates the disparity for a group of data bits and a Hadamard Transform that generates possible disparity values from the calculated disparity provided by the disparity counter. A minimum disparity value for the group of data bits can then be determined.

In accordance with another embodiment of the present invention, a method of encoding data comprises receiving a group of data bits, calculating the disparity for the group of data bits, and generating possible disparity values from the disparity calculation by employing a Walsh-Hadamard Transform to determine a minimum disparity value for the group of data bits.

A more complete understanding of the systems and methods for signal encoding and decoding will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 12 is a block diagram of a digital logic circuit for an inversion vector generator in accordance with an embodiment of the present invention.

The preferred embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

The present invention provides an improved signal encoding and decoding system and method for application in a wide range of coding applications. It should be understood that exemplary embodiments are described herein, but that these embodiments are not limiting and that numerous modifications and variations are possible in accordance with the principles of the present invention.

Disparity control is employed to provide desired characteristics such as a reduction in the run length or redundancy of the data, assist in the synchronization and clocking of the data, decrease the bandwidth of the transmitted signal, reduce the raw bit error rate, and allow AC coupling. Disparity encoding ensures that the number of ones and zeros are approximately equal, which results in a balanced code (e.g., an approximately equal number of logic ones and zeros which may assume values of plus and minus one). As an example, in certain applications such as with a high-speed back plane bus, eight bits (i.e., one byte) may be allocated for disparity control for each forward error correction (FEC) block of data (e.g., a unit of transmission such as a cell for an asynchronous transfer mode (ATM) system). Each block of data may be individually encoded as a group of 576 bits (72 bytes), for example, with disparity encoding employed to provide a balanced code.

For a large block length (with block length denoted as n), the power spectrum is essentially flat at n/(n−1) near the Nyquist bandwidth and approximately equal to zero at the DC value. The power spectrum characteristics of a code that has disparity of zero is given by the following equation:

$$S(\omega) = \frac{n}{n-1}\left[1 - \left(\frac{\sin(n \cdot \omega/2)}{n \cdot \sin(\omega/2)}\right)^2\right]$$

Figure 1:
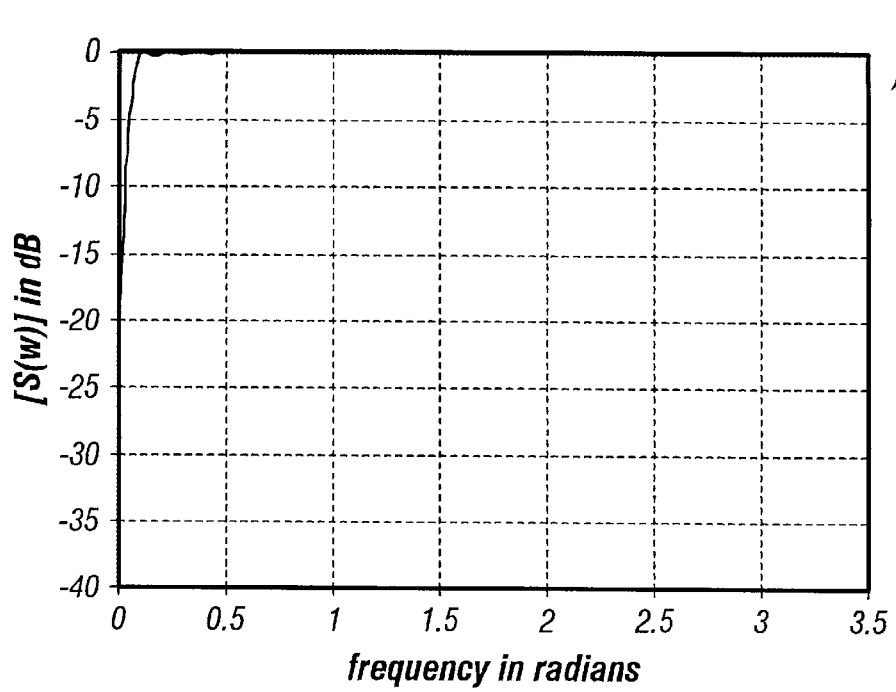
FIG. 1 is a graph of the power spectral density of a code in accordance with an embodiment of the present invention.

FIG. 1 shows a graph of the power spectral density (PSD) 100 of a running digital sum (RDS) limited code in accordance with an embodiment of the present invention. PSD 100 shows the spectrum of an RDS limited code for a value of n equal to fifty, with the magnitude of the power spectrum plotted in decibels (dB) on the ordinate axis and the frequency in radians on the abscissa axis. As can be seen from PSD 100, the power spectrum magnitude is essentially flat for frequency values greater than one but approaches zero as frequency values approach DC or zero frequency value.

For binary data and even values for n, the number of distinct zero-parity code words (denoted as $N_0$) of length n is given by the following binomial coefficient equation:

$$N_0 = \binom{n}{n/2} = \frac{n!}{\left(\left(\frac{n}{2}\right)!\right)^2}$$

These $N_0$ words can be distinguished with a total of $\log_2$ bits and, thus, the highest possible rate R of a zero disparity code is given by the following equation:

$$\hat{R} = \frac{1}{n}\log_2 N_0 = \frac{1}{n}\log_2 \frac{n!}{\left(\left(\frac{n}{2}\right)!\right)^2}$$

As an example, for a data block size of 448 bits, R equals 0.9872 and would require six bits to encode the data with zero disparity. Conventional algorithms for this binary to RDS code mapping may utilize table lookup methods for short block lengths. For the typical 8B/10B encoder discussed above, a block of eight bits is mapped to a group of ten bits. The mapping may be dependent on the disparity of the previous group of bits or the block of data may be coded independent of the other blocks, with the disparity codes utilizing large blocks of data for efficiency and ease of implementation. A significant drawback of these conventional algorithms is that a large number of operations or tables are required in order to encode the data.

The present signal encoding and decoding system and method provides an improved solution compared to conventional algorithms. In accordance with an embodiment of the present invention, an improved algorithm is provided that minimizes disparity of a data frame (i.e., block of data) and ensures that the data frame has sufficient transition density by encoding the data using Walsh-Hadamard transforms and inversion techniques. Embodiments of the present invention are more efficient than conventional disparity and transition density techniques by reducing the required overhead. For example, only 1 byte of overhead for every 64 bytes (i.e., approximately 1.5% overhead) is required rather than 2 bits out of every 10 bits (i.e., 20% overhead) for conventional 8B/10B encoders.

As an example, the bits to be encoded may be grouped into blocks of four bits each, referred to herein as a nibble. The disparity of each block of data is computed to determine the number of ones or zeros in a given nibble. For example, up to 64 bytes may be accepted into a frame to provide 128 nibbles. The nibble counts from the disparity calculation are transformed using a Hadamard matrix as in the following equation:

$$D = H^* v$$

where v and H denote the vector of the nibble count disparity (i.e., values for the number of ones in a nibble ranging from zero to four) and the Hadamard matrix, respectively. This operation transforms vector v, which consists of disparity values for 128 nibbles, to vector D using the Hadamard matrix H, where vector D represents all of the possible disparity values that can be generated from a vector v by Hadamard inversion or transformation techniques.

As an example for vector v comprising one byte (i.e., 2 nibbles), Hadamard matrix H may be represented as:

$$H(1) = \begin{bmatrix} 1 & 1 \\ 1 & -1 \end{bmatrix}$$

There are then two possibilities for minimum disparity encoding. The first possibility is to keep the current values of the nibbles. The second possibility is to invert the second nibble while leaving unchanged the first nibble. By inverting the exemplary Hadamard matrix H, as shown below, additional possibilities may be generated.

$$-H(1) = \begin{bmatrix} -1 & -1 \\ -1 & 1 \end{bmatrix}$$

The minimum disparity that can be achieved by applying the Hadamard transform to the data can then be found from the vector D. The index of this minimum disparity value is sent as a disparity word, as described in more detail below in reference to FIG. 8. The data is then inverted according to this index.

A back plane physical layer (also referred to as a back plane PHY or BPP) that connects a device to a transmission medium in a communication network is an exemplary application for an embodiment of the present invention. For example, in a BPP, the input to a disparity and transition density control block may be 56 bytes (i.e., 112 nibbles). The Hadamard matrix selected may correspond to a matrix size of 128 by 128 (i.e., n by n) with vector v and vector D each 128 nibbles in length. An additional 16 nibbles may be added to make the data frame size equal to 64 bytes. The 16 additional nibbles may be chosen to have zero disparity and sufficient transition density (e.g., 1001).

A direct implementation of the Hadamard transform, as described above, is complex and time consuming, but a Fast Hadamard transform provides a less complex alternative. For the Fast Hadamard transform, any Hadamard matrix H(n) of order n (i.e., n by n matrix) can be factored as:

$$H(n) = \bigotimes_{i=1}^{n} H(1), \text{ where } \otimes \text{ denotes a Kronecker product and}$$

$$H(1) = \begin{bmatrix} 1 & 1 \\ 1 & -1 \end{bmatrix}$$

For example, for the exemplary BPP application above having a data frame of 128 nibbles, n would equal 128.

Alternatively the matrix H(n) can be expressed as:

$$h(k, n) = (-1)^{\sum_i k_i n_i}$$

where $k_i$ and $n_i$ are the $i^{th}$ bits in the representation of k and n, respectively. This alternative structure or representation leads to very efficient methods for computing the Hadamard transform.

Figure 2:
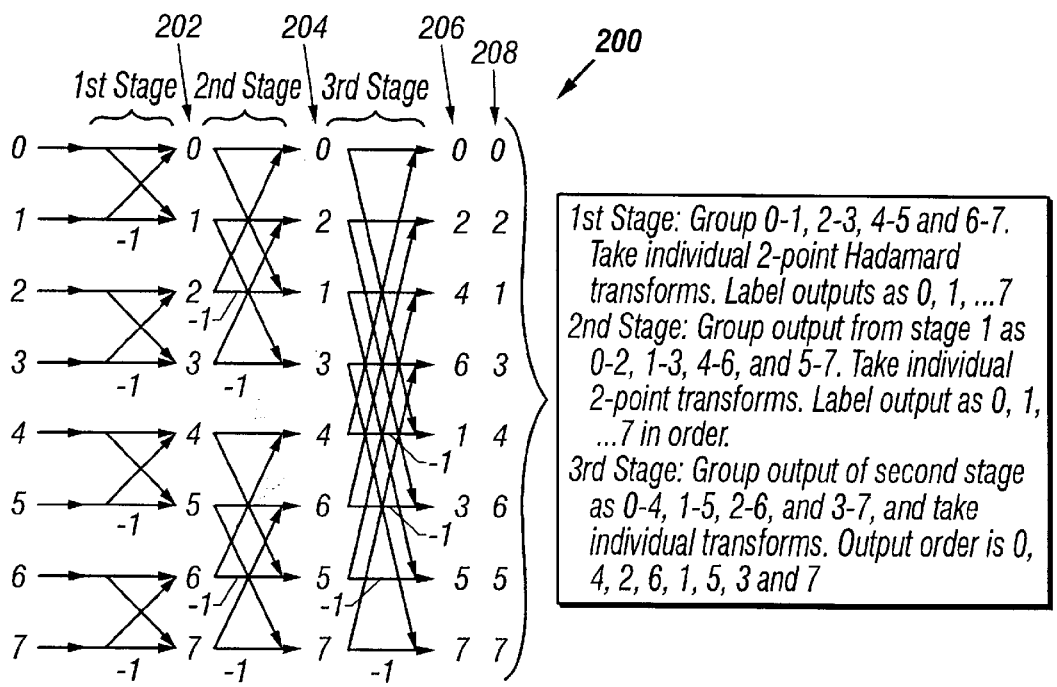
FIG. 2 illustrates three stages of an eight-point Fast Hadamard transform in accordance with an embodiment of the present invention.

FIG. 2 illustrates three stages of an eight-point Fast Hadamard transform 200 in accordance with an embodiment of the present invention. Fast Hadamard transform 200 accepts eight rows of data (e.g., nibble disparity values), represented as 0 through 7, with the first stage grouping rows 0 and 1, 2 and 3, 4 and 5, and 6 and 7. The first stage employs individual 2-point Hadamard transforms to generate a first stage output 202. Thus, the first stage transforms vector v by applying a 2 by 2 Hadamard transform to the vector.

The second stage groups the output from the first stage as 0 and 2, 1 and 3, 4 and 6, and 5 and 7, employs individual 2-point point Hadamard transforms, and generates a second stage output 204. The third stage groups the output from the second stage as 0 and 4, 1 and 5, 2 and 6, and 3 and 7, employs individual 2-point Hadamard transforms, and generates a third stage output 206. The output order for the third stage is 0, 4, 2, 6, 1, 5, 3, and 7 and an eight-point transform output index 208 from 0 to 7 corresponds to the output order for the third stage.

The application of the Fast Hadamard transform in accordance with an embodiment of the present invention can be analyzed in terms of algorithm performance. For example, it can be assumed that the bits are independent and that a −1 and a 1 have equal probability. Because the Hadamard matrix is orthonormal, the disparity values will be independent and identically distributed, with each disparity value having a binomial distribution given by the following equation:

$$P(K = k) = 2^{-n} \binom{n}{\frac{n+k}{2}} = \frac{n!}{2^n \left(\frac{n+k}{2}\right)! \left(\frac{n-k}{2}\right)!}$$

For large n this computation may become difficult due to the size of the factorial functions. For this reason, the distribution may be approximated as a Gaussian distribution as shown in the following equation:

$$p(k) \cong \frac{1}{\sqrt{2\pi n}} \exp\left[-\frac{(k)^2}{2n}\right]$$

where it is assumed that the probability of a −1 and a 1 is equally probable. Therefore, the mean of the random variable is 0, and the standard deviation is n (by the law of large numbers).

Figure 3:
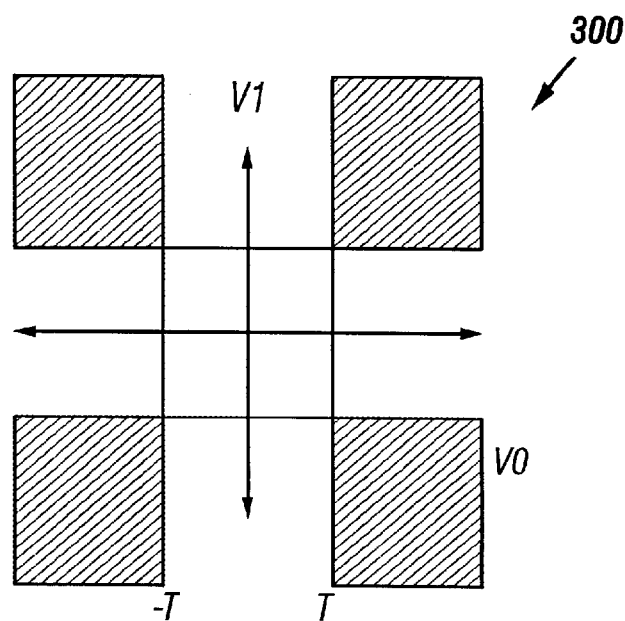
FIG. 3 illustrates graphically regions in a two-dimensional space where the probability density function of disparity is evaluated in accordance with an embodiment of the present invention.

The cumulative distribution function (cdf) of the minimum of m disparity values calculated over the vector of length m may then be determined. For example, FIG. 3 illustrates graphically regions in a two-dimensional space 300 where the probability density function of disparity for a two-element vector is evaluated in accordance with an embodiment of the present invention. If the minimum absolute value of the vector is less than T, then the shaded regions are the portions that are excluded from the allowable vector space. The probability that the minimum is less than T is then given by the following equation:

$$P = 1 - [erfc(T/\sqrt{2n})]^n$$

For n dimensions, the probability density function of the output having T disparity value is given by the following equation:

$$P(x) = \frac{2}{\pi} n \left[erfc(T/\sqrt{2n})\right]^{n-1} \left[1 - e^{-x^2}\right]$$

Figure 4:
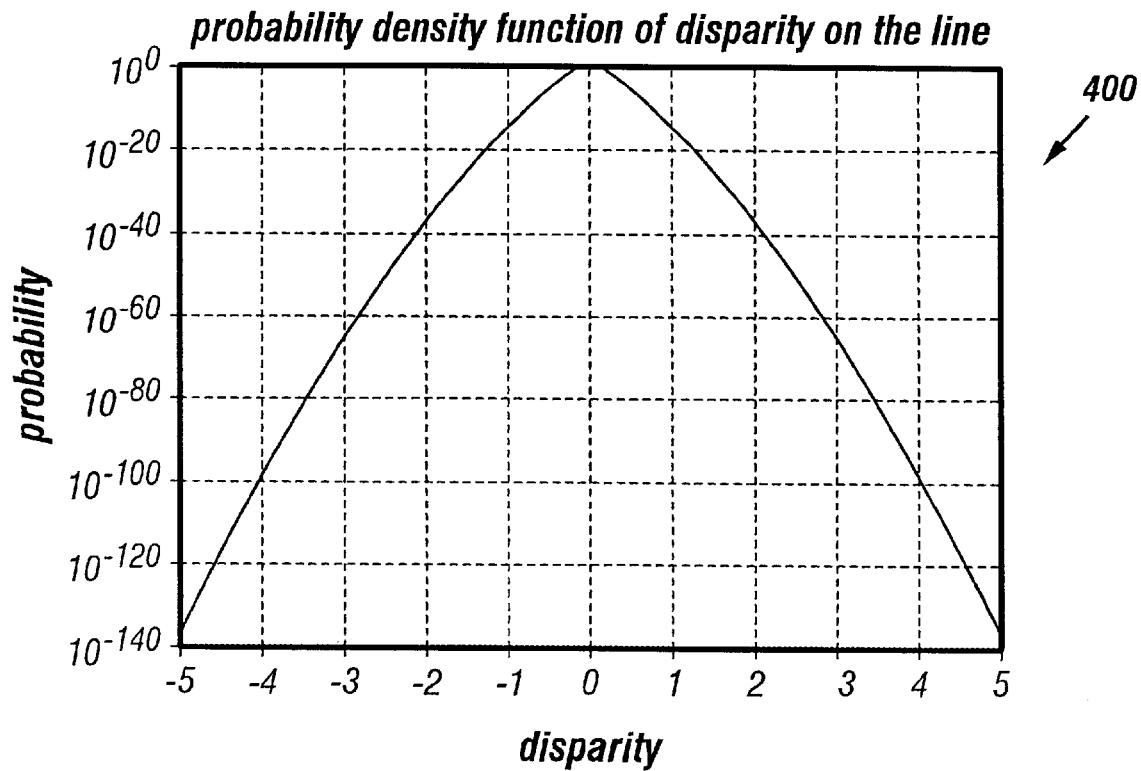
FIG. 4 is a graph of the ideal probability density function of disparity at the output of a signal encoder in accordance with an embodiment of the present invention.

FIG. 4 is a graph 400 of the ideal probability density function of disparity at the output of a signal encoder in accordance with an embodiment of the present invention. Graph 400 plots the ideal probability density function of disparity, with probability on the ordinate axis and disparity values on the abscissa axis. As can be seen from graph 400, there is a probability of one at zero disparity, with the probability dropping off rapidly for disparity values other than zero.

Graph 400 represents performance values for an ideal case, where the input to a disparity encoder can be encoded with a $2^{128}$ look-up table. However, when employing a Fast Hadamard transform as described in accordance with an embodiment of the present invention, there may exist, for example, only 256 possible transformations.

Figure 5:
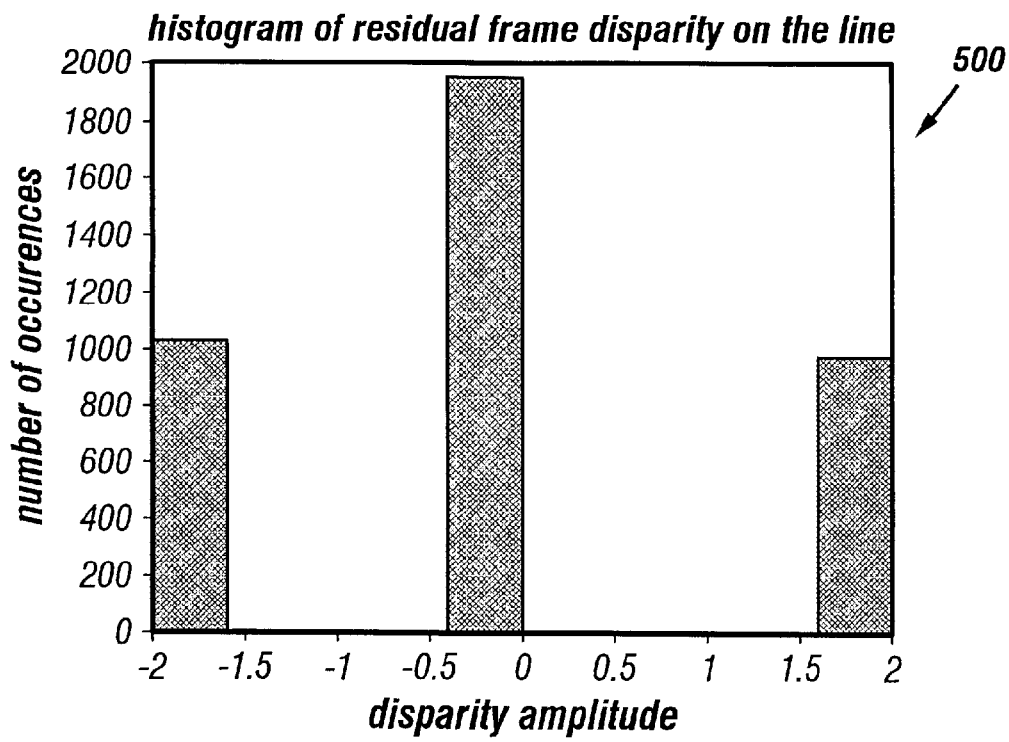
FIG. 5 is a graph of the simulated probability density function of disparity at the output of a signal encoder in accordance with an embodiment of the present invention.
Figure 6:
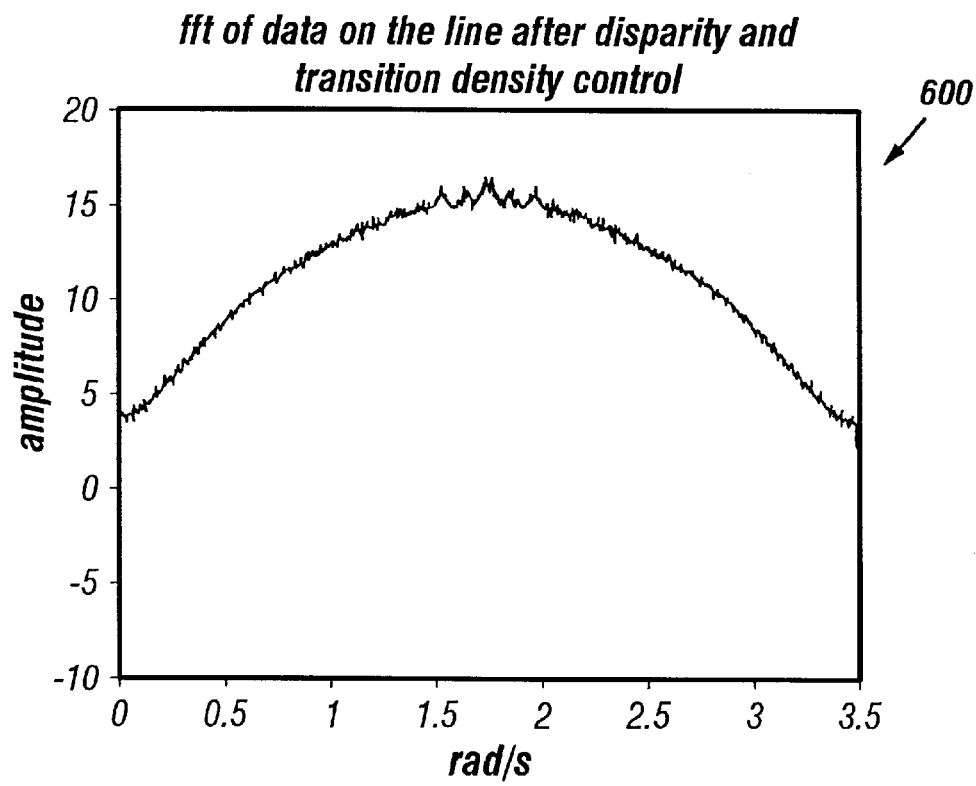
FIG. 6 is a frequency spectrum plot of the data output of a signal encoder in accordance with an embodiment of the present invention.
Figure 7:
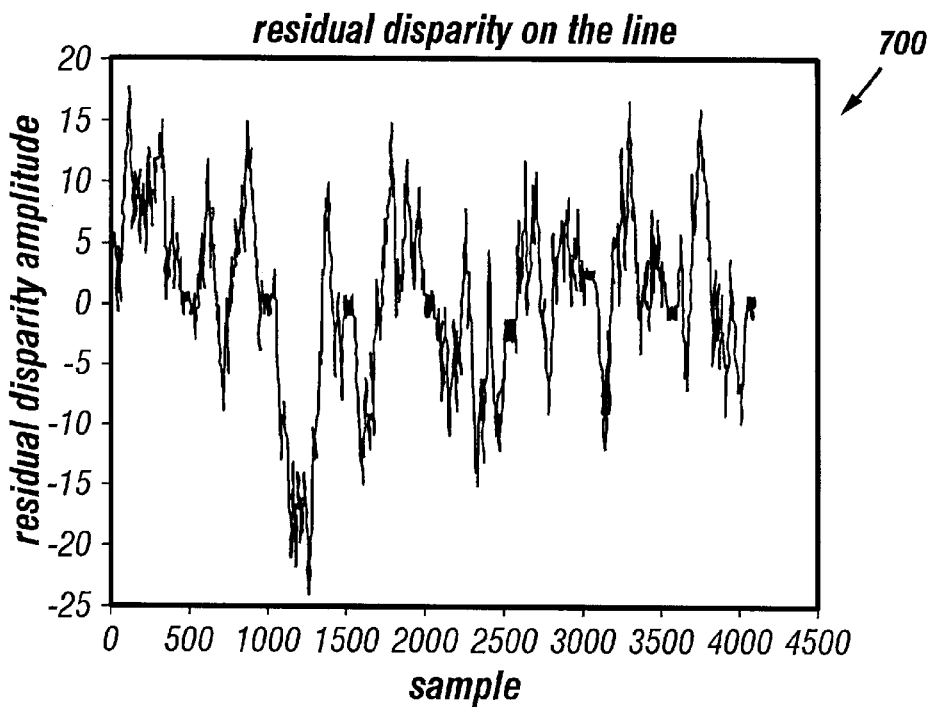
FIG. 7 is a graph illustrating the disparity at the output of a signal encoder in accordance with an embodiment of the present invention.

Appendix A contains a MatLab software program that provides a disparity and transition density control algorithm simulation in accordance with an embodiment of the present invention. The program generates various plots that include residual frame disparity, frequency spectrum of the output data, and bit level residual disparity as illustrated in FIGS. 5–7. Thus, FIGS. 5–7 provide simulation results for disparity values and transition density for an encoder employing an exemplary Fast Hadamard transform in accordance with an embodiment of the present invention.

FIG. 5 is a histogram 500 for residual disparity at the output of a signal encoder in accordance with an embodiment of the present invention. Histogram 500 plots the number of occurrences on the ordinate axis and disparity amplitude on the abscissa axis for 4000 data frame trials. FIG. 6 is a frequency spectrum plot 600 of data at the output of a signal encoder in accordance with an embodiment of the present invention. Frequency spectrum plot 600 plots the Fast Fourier Transform of data after disparity and transition density control, with amplitude plotted on the ordinate axis and frequency plotted in radians per second on the abscissa axis. As can be seen from FIG. 6, there is a null at DC, which is desirable for AC coupling. The frequency goes up to 3.5 ($2\pi$), which is the highest frequency component (i.e., sampling frequency). FIG. 7 is a graph 700 illustrating the residual disparity at the output of a signal encoder in accordance with an embodiment of the present invention. Graph 700, which plots the residual disparity amplitude on the ordinate axis versus the sample on the abscissa axis, illustrates the bit level residual disparity at the output of a signal encoder As noted above, transition density is an important characteristic of a data frame. For example, sufficient transition density must exist to allow a phase-lock loop circuit in a receiver to properly lock or synchronize with the frequency and phase of the signal. For high-speed applications such as with BPP applications, a signal may require at least a single transition in every 16 bits. However, data sent to a disparity module may be random, with data assuming any value between all zeros to all ones. Consequently, depending on the data, a certain amount of encoding or scrambling should be applied to ensure a sufficient number of transitions in the signal.

Transition density encoding may be included or embedded with a disparity checker for applications such as the BPP. For example, one method to combine these functions is to determine whether the encoding or scrambling performed for disparity also satisfies transition density requirements. As an example, a flag may be utilized in conjunction with the Hadamard transform such that each time a possible disparity pattern is calculated, the validity of its transition density is also determined. Therefore, at the completion of the calculations, the data having optimal disparity along with sufficient transition density may be selected.

Figure 8:
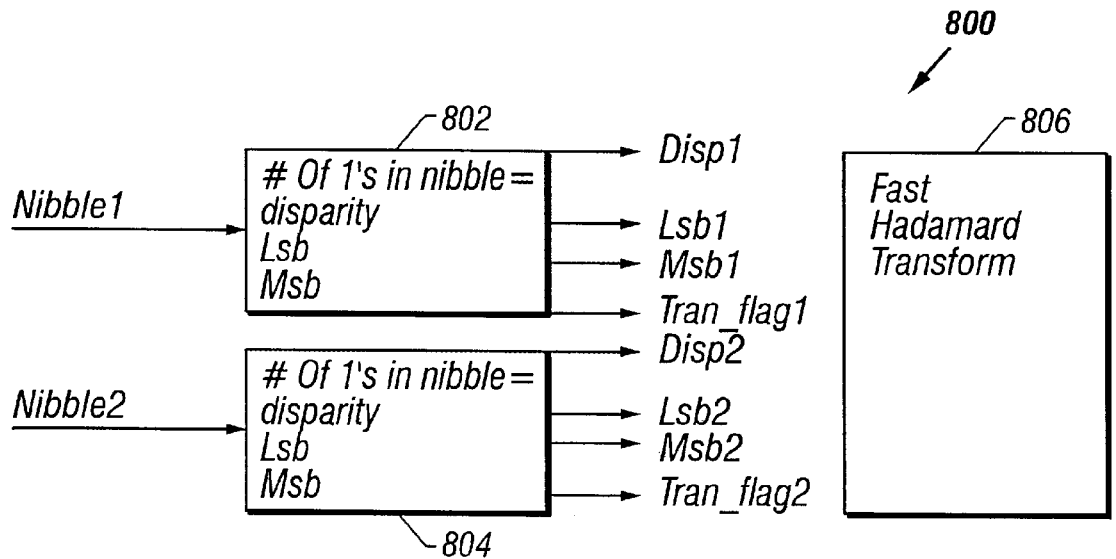
FIG. 8 is a block diagram of the arrangement of a disparity and transition density counter along with a Fast Hadamard transform in accordance with an embodiment of the present invention.

FIG. 8 is a block diagram of a system 800 illustrating the arrangement of disparity and transition density counters 802, 804 along with a Fast Hadamard transform 806 in accordance with an embodiment of the present invention. For system 800, incoming data is separated into nibbles, such as nibble 1 and nibble 2, and received by respective disparity and transition density counters 802, 804. Each nibble comprises 4 bits of data, with the two nibbles (nibble 1 and nibble 2) forming a byte of data.

Disparity and transition density counters 802, 804 calculate the nibble disparity, for respective data inputs nibble 1 and nibble 2, by counting, for example, the number of ones in the respective nibble. Alternatively, the number of zeros may be counted. The count value will be between 0 and 4, with for example the number of logic ones counted (0, 1, 2, 3, and 4) corresponding to a disparity value of –4, –2, 0, 2, and 4, respectively. The disparity count value signals (denoted as Disp1 and Disp2 signals in FIG. 8) are calculated by respective disparity and transition density counters 802, 804, and each can be represented by 3 bits. Disp1 and Disp2 signals, which contain the disparity count values for the respective nibbles, are then provided to Fast Hadamard Transform 806, which is a two-point Fast Hadamard Transform.

Additionally, disparity and transition density counters 802, 804 also output the least significant and most significant bits (Lsb1, Msb1, Lsb2, and Msb2) along with a transition flag (Tran_flag1 and Tran_flag2) of respective nibble 1 and nibble 2. The least and most significant bits are used to determine possible combinations of nibbles and bytes that have sufficient transition density, as described in more detail below in reference to FIG. 9. The transition flag is set if there is a transition in the corresponding nibble. For example, Tran_flag1 is set to one if nibble 1 contains a transition. Fast Hadamard Transform 806 then operates on the data provided by disparity and transition density counters 802, 804 to determine various possible disparity values, with the transition density requirement as described in greater detail below in reference to FIG. 9.

The principles of the present invention are applicable to many types of signal coding, decoding, and conditioning applications. For example, disparity and transition density control utilizing Fast Hadamard transform techniques may be applied to a back plane Phy (BPP) application as noted above. In general, for a BPP application, the disparity and transition density control block may precede a forward error correction (FEC) encoder at the transmitter side. The disparity and transition density control block encodes or scrambles the data to provide minimum disparity and sufficient transition density. An index of the encoding or scrambling pattern may be added as an additional byte attached at the end of a block of data received from, for example, the asynchronous transfer mode (ATM) Layer. Thus, incoming data would comprise 56-bytes, with 1 byte of disparity control added, so that 57 bytes are provided to the FEC Encoder.

Figure 9:
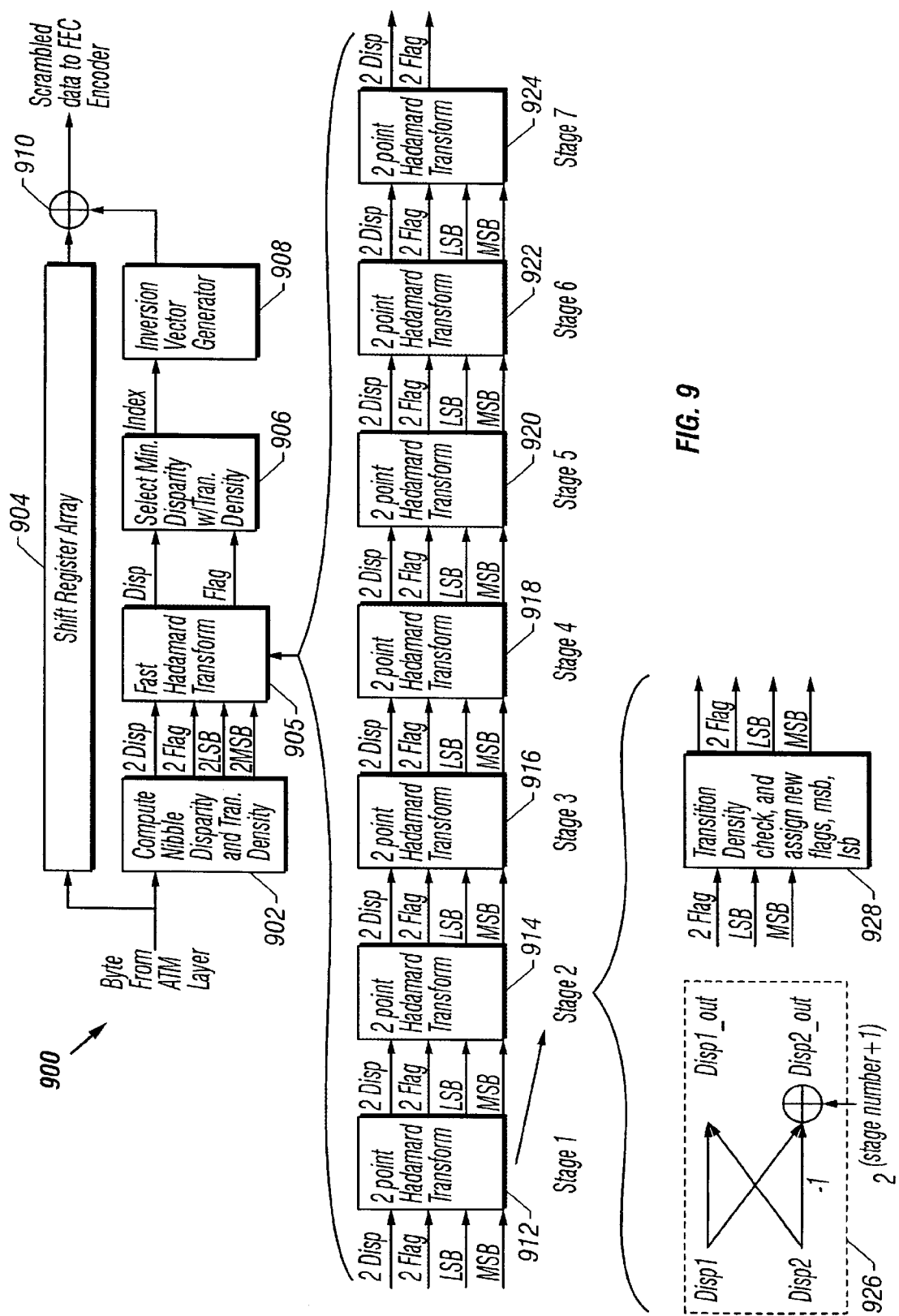
FIG. 9 is a block diagram of a disparity and transition density control module for a back plane physical layer application in accordance with an embodiment of the present invention.

FIG. 9 is a block diagram for a system 900 of an exemplary disparity and transition density control module for a BPP application in accordance with an embodiment of the present invention. System 900 comprises a disparity and transition density counter 902, a shift register array 904, a Fast Hadamard transform 905, a minimum pattern selector 906, an inversion vector generator 908, and an Exclusive-OR gate 910.

In operation, a byte of data is received from the ATM layer by disparity and transition density counter 902 and shift register array 904. Disparity and transition density counter 902, which for example may comprise disparity and transition density counters 802 and 804, divides the received byte into two nibbles and calculates the disparity and determines whether a transition occurs for each nibble. Disparity and transition density counter 902 generates outputs that correspond to the disparity value (Disp signal), whether a transition occurred (Flag signal), and least and most significant bit (LSB and MSB, respectively) for each nibble of data.

Fast Hadamard Transform 905 receives Disp, Flag, LSB, and MSB data, for each of the two nibbles, from disparity and transition density counter 902, and outputs disparity values (Disp) and respective transition density (Flag). As shown in FIG. 9, Fast Hadamard Transform 905 comprises seven individual two-point Fast Hadamard Transforms 912, 914, 916, 918, 920, 922, and 924 that are arranged in a consecutive fashion (although each consecutive stage may include more than one two-point Fast Hadamard). Each Fast Hadamard Transform 912 through 924 functions in a similar fashion by receiving two disparity values (2 Disp), two flags (2 Flag), and two LSB and MSB values for the two nibbles and generating outputs for the two disparity values, two flags, and two LSB and MSB values.

As an example of operation, Fast Hadamard Transform 912 (i.e., the first stage) receives two disparity values (2 Disp signals), each value being three bits, along with LSB1, MSB1, Flag, and LSB2, MSB2, and Flag, respectively, for two nibbles. The output disparity values generated, each value being four bits and denoted as 2 Disp or Disp1_out and Disp2_out (as illustrated in exemplary output disparity calculator 926), are calculated as in the following equations:

Disp1_out=Disp1+Disp2

Disp2_out=Disp1+(4-Disp2)

where Disp1 and Disp2 correspond to the two input disparity values (denoted as 2 Disp) for the respective two nibble inputs.

The transition density flag outputs, denoted as 2 Flag or as one bit values designated as Tran_flag1_out and Tran_flag2_out corresponding to respective nibble inputs, are then determined. Tran_flag1_out is set true if the input transition flags (i.e., 2 Flag signals comprised of Tran_flag1 and Tran_flag2) are both set true or if MSB1 is not equal to LSB2 (i.e., there is a transition if the last bit of the first nibble is different from the first bit of the second nibble). Tran_flag2 out is set true if the input transition flags are both set true or if MSB1 is equal to LSB2 (i.e., there is a transition if the last bit of the first nibble is the same as the first bit of the second nibble which is inverted).

The least significant bit and the most significant bit output values are then determined by the following equations:

LSB1_out=LSB1;

MSB1_out=MSB2;

LSB2_out=LSB1; and

MSB2_out=Not MSB2 (MSB2 Inverted).

After execution of Fast Hadamard Transform 912 (i.e., the first stage), the information generated may be stored for use by the next stage. For example, because of the reordering of inputs for subsequent stages, a certain number of outputs generated from the previous stage are stored for use by the next stage. Specifically, information for four outputs may be stored after the first stage (i.e., two outputs from the first and second transform of data generated from the first stage). The input to Fast Hadamard Transform 914 (i.e., the second stage) is then arranged as the first and third output of the first stage, then second and fourth output, etc., as similarly described in detail in reference to FIG. 2.

The Fast Hadamard Transform 914 along with Fast Hadamard Transforms 916 through 924 receive a number of disparity values (2 Disp signals) along with least and most significant bits (LSB and MSB, respectively) and Flag for transition density, as described similarly for Fast Hadamard Transform 912. The output disparity value calculations for each Fast Hadamard Transform 912 through 924 may be described in a general fashion by the following equations:

Disp1_out=Disp1+Disp2

Disp2_out=Disp1+($2^{(stage\ number+1)}$-Disp2)

For example, $2^{(stage\ number+1)}$ equals 8 and 16 for Fast Hadamard Transform 914 (i.e., the second stage) and Fast Hadamard Transform 916 (i.e., the third stage), respectively. An output disparity calculator 926 illustrates the general disparity calculations for a given stage. The LSB (LSB1_out and LSB2_out), MSB (MSB1_out and MSB2_out), and output transition flags (Tran_flag1_out and Tran_flag2_out) for Fast Hadamard Transforms 914 through 924 are also calculated in a similar fashion as described above for Fast Hadamard Transform 912, as indicated by block 928. However, the output transition flags for Fast Hadamard Transforms 914 through 924 may not need to consider least and most significant bit information.

After execution of Fast Hadamard Transform 914 (i.e., the second stage), the information generated may be stored for use by the next stage. Specifically, information for eight outputs may be stored after the second stage. The input to Fast Hadamard Transform 916 (i.e., the third stage) is then arranged as the first and fifth output of the second stage, then second and sixth output of the second stage, etc. In general, at the end of each stage, the information generated comprises $2^{(stage\ number+1)}$ values that can be shuffled or rearranged prior to providing the values to the following stage. For example, at the end of the third stage, sixteen values may be stored, with the first and ninth output provided to the fourth stage, then the second and tenth, etc.

Figure 10:
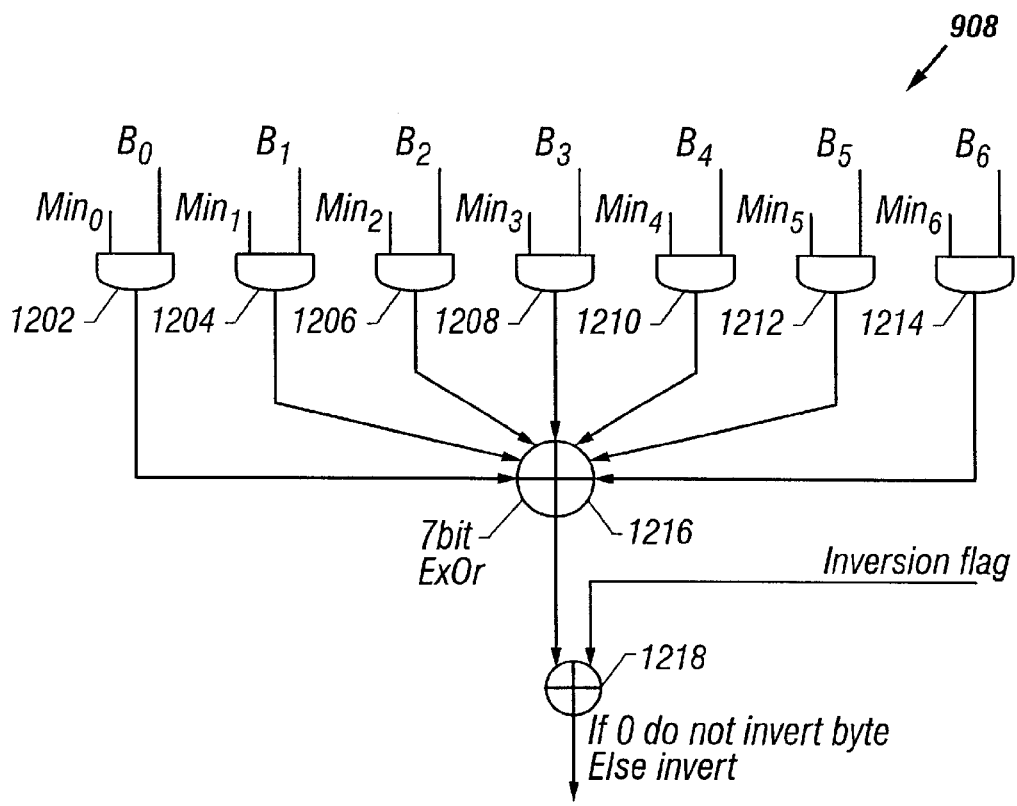
FIG. 10 illustrates the values for a normal and dual counter in accordance with an embodiment of the present invention.

At the end of the seventh stage, the outputs will be arranged or shuffled one last time. Fast Hadamard Transform 905 generates all of the possible disparity values (Disp signal) and a Flag signal indicating the transition density for each disparity value calculated. The disparity value outputs are not ordered and may be output as 0, 64, 32, 96, 16, 80, 48, 112, etc. This order or counting operation may be performed by a counter (i.e., a dual counter) having its least to most significant bit order reversed as illustrated in FIG. 10. As shown in FIG. 10, the bit order for a normal counter from MSB to LSB is represented as $A_7$ to $A_1$, respectively. The bit order for a dual counter from MSB to LSB is represented as $B_1$ to $B_7$, respectively, which is opposite the bit order of the normal counter. Consequently, the normal counter will count values, for example, of 0, 1, 2, 3, and 4, while the dual counter will count these same bits as 0, 64, 32, 96, and 16, respectively.

Fast Hadamard Transform 905 may comprise a 128-point transform. As discussed above, however, an ATM frame may comprise only 56 bytes (i.e., 112 nibbles). Thus, 16 neutral or additional nibbles may be appended to the ATM frame so that the data frame is 128 nibbles long. The 16 neutral nibbles may be selected having zero disparity and at least one transition such as, for example, byte 10011001 repeated eight times.

Minimum pattern selector 906, as shown in FIG. 9, determines the most suitable inversion pattern for the current 56-byte ATM frame. Minimum pattern selector 906 determines the most suitable inversion pattern by selecting the index number generated by Fast Hadamard Transform 905 that corresponds to the minimum disparity value having sufficient transition density (i.e., Flag is set true). Specifically, minimum pattern selector 906 monitors each result of Fast Hadamard Transform 905 and updates its selection for the minimum disparity value that also has sufficient transition density.

In this exemplary embodiment of the present invention, system 900 is arranged in the transmitter prior to the FEC encoder (not shown). Thus, certain steps may be taken with respect to initialization of the disparity value. For example, because system 900 is prior to the FEC encoder, system 900 does not ensure that FEC check digits are encoded or scrambled in regards to minimum disparity value. To reduce possible effects to disparity due to these FEC check bytes (e.g., 15 bytes), disparity of the FEC check bytes from the previous block of data may be added to every output of Fast Hadamard Transform 905. Minimization of disparity is then performed after this operation.

The output values generated by an exemplary 128-point transform such as Fast Hadamard Transform 905 may be between, for example, 0 and 512. Specifically, values 0 to 255 maps to −256 to −1, values 257 to 512 maps to 1 to 256, and value 0 maps to 0. Thus, minimal disparity is achieved by making the disparity value as close to 256 as possible. Although Fast Hadamard Transform 905 generates 128 different values, the inverted patterns from these 128 encoding or scrambling candidates are also potential candidates for generating minimum disparity. The inverted patterns may be evaluated by subtracting from 512 an output value of Fast Hadamard Transform 905 and then determining if the result is a valid minimum. To indicate an inversion pattern or evaluation, an inversion flag (e.g., one bit) may be provided and set true when inversion is desired or being performed.

Figure 11:
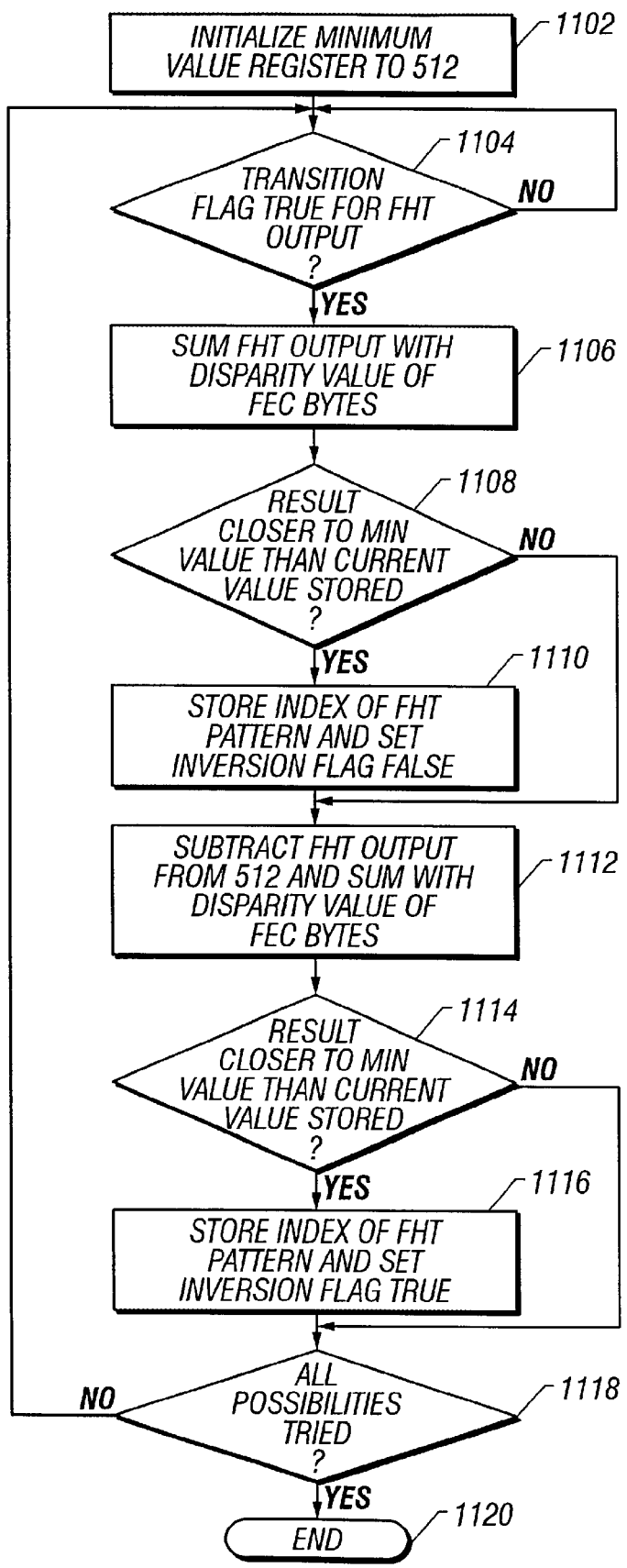
FIG. 11 is a flowchart illustrating coding compensation and data inversion in accordance with an embodiment of the present invention.

FIG. 11 is a flowchart 1100 illustrating an exemplary algorithm for coding compensation and data inversion pattern consideration in accordance with an embodiment of the present invention. The register of minimum pattern selector 906 is initialized to 512 and begins receiving the data from Fast Hadamard Transform 905 (step 1102). If the transition flag is not set true (e.g., value of 1) at step 1104, then the algorithm proceeds to the next output from FHT 905. Otherwise, the corresponding output value from FHT 905 is added to the disparity value of the FEC bytes (e.g., 146) at step 1106 and compared with the minimum value contained in the register of minimum pattern selector 906 at step 1108. If the new value is closer to the optimal minimum value (e.g., 256) than the current minimum value stored, the index of the pattern from FHT 905 is stored along with the new minimum value and the inversion flag is set false (e.g., value of 0) at step 1110.

Step 1112 subtracts the output value of FHT 905 from 512 and then sums the result with the disparity value of the FEC bytes. If the result is closer to the optimal minimum value (e.g., 256) than the current minimum value stored (step 1114), then the index of the pattern from FHT 905 along with the new minimum value is stored and the inversion flag is set true at step 1116. If all of the possible outputs from FHT 905 are evaluated, then the minimum value or index is then sent to inversion vector generator 908.

FIG. 12 is a block diagram of a digital logic circuit for an inversion vector generator 908 in accordance with an embodiment of the present invention. Inversion vector generator (IVG) 908, for the exemplary BPP application, generates the correct inversion pattern for the ATM frame bytes as they exit system 900 towards the FEC encoder. The inversion pattern is determined from the minimum pattern index vector, which is a 7-bit number (labeled as $Min_0$ to $Min_6$) with a value between 0 and 127, received from minimum pattern selector 906. Another counter provides the index numbers for the ATM byte having count values between 0 and 127 for the 7-bit number (labeled as $B_0$ to $B_6$).

IVG 908 determines the pattern for the particular ATM data byte by utilizing AND gates 1202 through 1214 to perform a logical AND operation for bit pairs $Min_0$, $B_0$ through $Min_6$, $B_6$, respectively. The result from AND gates 1202 through 1214 is received by a 7-bit Exclusive-OR gate 1216, which generates an output for Exclusive-OR gate 1218. An inversion flag and the output from Exclusive-OR gate 1216 determines the result generated by Exclusive-OR gate 1218, with a "logic low" level (i.e., a zero) indicating no inversion for the ATM byte while a "logic high" level (i.e., a one) indicates that inversion is required.

After the processing is completed within system 900, the index number of the inversion pattern, comprised of seven bits, and the inversion flag, representing the eighth bit, are appended as the $57^{th}$ byte to the ATM data frame. When the receiver receives the data, the decoding or descrambling of the data frame is performed in a similar fashion. For example, after the FEC decoder, the corresponding disparity and transition density decoder or descrambler will receive 57 bytes, with the $57^{th}$ byte being the decoding or descrambling pattern. The same operations are then performed, as described above, but in reverse order to find the coding or scrambling pattern that can be applied to recover the original 56-byte data.

It should be understood that the present invention provides significant advantages over conventional disparity and transition density control techniques. In accordance with an embodiment of the present invention, Walsh-Hadamard transforms and inversion techniques are employed to calculate the minimum disparity achievable. Depending upon the result of these calculations, the data is encoded and a minimal amount of overhead is added. The algorithms are flexible and permit scaling of the data frame size. For example, a frame size may be selected based on the power of 2 (e.g., 2, 4, 8, 16, etc.) or three times a power of two, with the algorithm's performance generally improving as the frame size increases.

Embodiments described above illustrate but do not limit the invention. It should also be understood that numerous modifications and variations are possible in accordance with the principles of the present invention. Accordingly, the scope of the invention is defined only by the following claims.

APPENDIX A

A-1

```
%program to test and simulate disparity and
% transition density control for 56 byte ATM frame application
% functions needed under same directory:
%     1) nibble_calc.m
%     2) fast_hadamard.m
%     3) tran_den_calc.m %first generate data
clear;
%clf;

%variable for spectrum estimation
spectrum = 0;
limit_t = 100;
residual_frame_dis = 0;
%load data_out_max;

% try 500 times 8 frames each and estimate the spectrum of the data on the line
% by least squares estimation method
for (fft_trial = 1:limit_t)
    fft_trial
    max_dis = 0;
    residual_dis = 0;
    for (block_trial = 1:8)
        for (i=1:56) %for ATM frame we just receive 56 bytes of data
            data(i) = round(rand*255); %data between 0-255
        end
        for (i=57:64)
            data(i) = 170; %dummy data with transition density and disparity
        end % calculate the nibble disparity, least significant bit, most sb and transition
density
        % for this input ATM frame
        % nibble is the name of 4 bit data
```

A-2

OUTPUT CODERUN

```
[nibble, lsb, msb, tran_den] = nibble_calc(data);

% take hadamard transform of these nibble disparities to find possible output
combinations
[res1, tran_den_out] = fast_hadamard(nibble, lsb, msb, tran_den);

%inversion of the result is also needed
total = [res1 ; 512-res1; tran_den_out];

%search for minimum disparity with transition density
minim = 512;
minim_abs = 512;
for (i=1:length(res1))
    if (tran_den_out(i) == 1)
        if (abs(residual_frame_dis+res1(i) - 256) < abs(minim - 256))
            minim = residual_frame_dis+res1(i);
            flag = 0; %no inversion
            minindex = i;
        end
        if (abs(residual_frame_dis+512-res1(i) - 256) < abs(minim - 256))
            flag = 1; %inversion
            minim = residual_frame_dis+512-res1(i);
            minindex = i;
        end
    end
end % get individual bits of minimum pattern index number
for (l=1:8)
    bit_row(l) = bitget(minindex-1, l);
end % find the scrambling pattern associated with minindex
for(j=1:128)
```

A-3

```
for (l=1:8)
    bit_col(l) = bitget(j-1, l);
    temp(l) = bit_col(l) & bit_row(l);
end
had_2(j) = 0;
for (l=1:8)
    had_2(j) = xor(had_2(j), temp(l));
end
if (flag)
    had_2(j) = ~had_2(j); %inversion
end % apply scrambling to ATM frame
for (i=1:length(data))
    for (j=1:8)
        bits(j) = bitget(data(i), j);
    end
    if (had_2(2*(i-1) + 1) == 1)
        for (j=1:4)
            bits(j) = ~bits(j);
        end
    end
    if (had_2(2*i) == 1)
        for (j=5:8)
            bits(j) = ~bits(j);
        end
    end
    data_out(i) = 2^7*bits(8) + 2^6*bits(7) + 2^5*bits(6) + ....
        2^4*bits(5) + 2^3*bits(4) + 2^2*bits(3) + 2^1*bits(2) + bits(1);
end % test the resultant scrambled ATM frame
[nibble_2, lsb_2, msb_2, tran_den_2] = nibble_calc(data_out);
```

A-4

```
check_in = nibble*ones(1,128)';
check_out = nibble_2*ones(1,128)';

% residual ATM frame disparity on the line calculated
residual_frame_dis = residual_frame_dis+(check_out - 256)

% gather information about bit disparity on the line
for (i=1:length(data_out))
    for (j=1:8)
        data_bit_out = bitget(data_out(i),j);
        residual_dis = residual_dis + (data_bit_out - 0.5)*2;
        dis_on_line((block_trial-1)*8+length(data_out)+(i-1)*8+j) = residual_dis;
        data_on_line((block_trial-1)*8+length(data_out)+(i-1)*8+j) =(data_bit_out - 0.5)*2;
        if (abs(residual_frame_dis) > 2)
            data_max ((i-1)*8+j) = data_bit_out;
        end
    end
end
if (abs(residual_frame_dis) > 2)
    nibble_max = nibble_2;
    total_max = total;
    data_out_max_abs = data;
end % estimate the spectrum of the scrambled ATM frame
res_tot((fft_trial-1)*8+ block_trial) = 2*residual_frame_dis;
end
spectrum = spectrum + abs(fft(data_on_line, 1000)).^2;
end freq = 0:3.5/1000:3.5-0.001;
spectrum = (sqrt(spectrum/limit_t));
```

A - 5

```
spectrum_window = spectrum.*hamming(length(spectrum))';
spectrum_window_db = 10*log10(spectrum_window);
plot(freq, spectrum_window_db);
title('fft of data on the line after disparity and transition density control');
xlabel('rad/s');
ylabel('amplitude');

figure(2)
plot(res_tot);
title(' residual frame disparity on the line');
xlabel('sample');
ylabel('residual disparity amplitude');

figure(3)
hist(res_tot);
title(' histogram of residual frame disparity on the line');
xlabel('disparity amplitude');
ylabel('number of occurences');
```

```
function [result, tran_den_out] = fast_hadamard(input, lsb, msb, tran_den)
% function to implement fast hadamard transform and transition density check
% input is disparity of individual nibbles
% lsb and msb coresponds to most and least sig. bits of input byte
% tran_den is a flag indicating a transition within each nibble
% input is 4 elements, calculate 4 point hadamard transform
% first apply 1st hadamard transform dimension = length(input);
had_2_matrix = [1 1; 1 -1];

%first stage
for (i=1:dimension/2)
    had_res1(2*i-1:2*i) = (had_2_matrix * input(2*i-1:2*i)')+ [0 4]';
    %compute transition density flag for next level
    %stayed here
    [tran_den_1(2*i-1)+1), tran_den_1(2*i), lsb_1(2*(i-1) + 1), msb_1(2*(i-1) + 1), lsb_1(2*i), msb_1(2*i)] = ...
        tran_den_check(tran_den(2*(i-1)+1), tran_den(2*i), lsb(2*(i-1)+1), msb(2*(i-1)+1), lsb(2*i), msb(2*i), 1);
end %second stage
for (i=1:dimension/4)
    for (j=1:2)
        had_res2(4*(i-1)+2*j-1:4*(i-1)+2*j)=(had_2_matrix*[had_res1(4*(i-1)+j) had_res1(4*(i-1)+j+2)]')+[0 8]';
        [tran_den_2(4*(i-1)+2*j-1), tran_den_2(4*(i-1)+2*j),...
            lsb_2(4*(i-1)+2*j-1), msb_2(4*(i-1)+2*j-1), lsb_2(4*(i-1)+2*j), msb_2(4*(i-1)+2*j)] = ...
            tran_den_check(tran_den_1(4*(i-1)+j), tran_den_1(4*(i-1)+j+2), lsb_1(4*(i-1)+j), msb_1(4*(i-1)+j), lsb_1(4*(i-1)+j+2), msb_1(4*(i-1)+j+2), 2);
    end
end
```

A-7

```
%third stage
for (i=1:dimension/8)
    for (j=1:4)
        had_res3(8*(i-1)+2*j-1:8*(i-1)+2*j) = (had_2_matrix * [had_res2(8*(i-1)+j)
had_res2(8*(i-1)+j+4)]')+[0 16]';
            [tran_den_3(8*(i-1)+2*j-1), tran_den_3(8*(i-1)+2*j), ....
            lsb_3(8*(i-1)+2*j-1), lsb_3(8*(i-1)+2*j), msb_3(8*(i-
1)+2*j)] = ...
            tran_den_check(tran_den_2(8*(i-1)+j), tran_den_2(8*(i-1)+j+4),...
            lsb_2(8*(i-1)+j), msb_2(8*(i-1)+j), lsb_2(8*(i-1)+j+4), msb_2(8*(i-1)+j+4), 2);
    end
end %4th stage
for (i=1:dimension/16)
    for (j=1:8)
        had_res4(16*(i-1)+2*j-1:16*(i-1)+2*j) = (had_2_matrix * [had_res3(16*(i-1)+j)
had_res3(16*(i-1)+j+8)]')+ [0 32]';
            [tran_den_4(16*(i-1)+2*j-1), tran_den_4(16*(i-1)+2*j),....
            lsb_4(16*(i-1)+2*j-1), lsb_4(16*(i-1)+2*j),
msb_4(16*(i-1)+2*j)] = ...
            tran_den_check(tran_den_3(16*(i-1)+j), tran_den_3(16*(i-1)+j+8),...
            lsb_3(16*(i-1)+j), msb_3(16*(i-1)+j),lsb_3(16*(i-1)+j+8), msb_3(16*(i-1)+j+8),
0);
    end
end %5th stage
for (i=1:dimension/32)
    for (j=1:16)
        had_res5(32*(i-1)+2*j-1:32*(i-1)+2*j) = (had_2_matrix * [had_res4(32*(i-1)+j)
had_res4(32*(i-1)+j+16)]')+ [0 64]';
            [tran_den_5(32*(i-1)+2*j-1), tran_den_5(32*(i-1)+2*j),....
            lsb_5(32*(i-1)+2*j-1), lsb_5(32*(i-1)+2*j),
msb_5(32*(i-1)+2*j)] = ...
```

```
tran_den_check(tran_den_4(32*(i-1)+j), tran_den_4(32*(i-1)+j+16),...
    lsb_4(32*(i-1)+j), msb_4(32*(i-1)+j), lsb_4(32*(i-1)+j+16), msb_4(32*(i-1)+j+16), 0);
   end
end %6th stage
for (i=1:dimension/64)
   for (j=1:32)
      had_res6(64*(i-1)+j+32)]')+ [0 128]';
had_res5(64*(i-1)+2*j-1:64*(i-1)+2*j) = (had_2_matrix * [had_res5(64*(i-1)+j),...
      [tran_den_6(64*(i-1)+2*j-1), tran_den_6(64*(i-1)+2*j),...
      lsb_6(64*(i-1)+2*j-1), lsb_6(64*(i-1)+2*j),...
msb_6(64*(i-1)+2*j)] =...
      tran_den_check(tran_den_5(64*(i-1)+j), tran_den_5(64*(i-1)+j+32),...
         lsb_5(64*(i-1)+j), msb_5(64*(i-1)+j), lsb_5(64*(i-1)+j+32), msb_5(64*(i-1)+j+32), 0);
   end
end %7th stage
for (i=1:dimension/128)
   for (j=1:64)
      had_res6(128*(i-1)+j+64)]')+ [0 256]';
had_res6(128*(i-1)+2*j-1:128*(i-1)+2*j) = (had_2_matrix * [had_res6(128*(i-1)+j),...
      [tran_den_7(128*(i-1)+2*j-1), tran_den_7(128*(i-1)+2*j),...
      lsb_7(128*(i-1)+2*j-1), lsb_7(128*(i-1)+2*j),...
msb_7(128*(i-1)+2*j)] =...
      tran_den_check(tran_den_6(128*(i-1)+j), tran_den_6(128*(i-1)+j+64),...
         lsb_6(128*(i-1)+j), msb_6(128*(i-1)+j), lsb_6(128*(i-1)+j+64), msb_6(128*(i-1)+j+64), 0);
   end
end for (j=0:dimension-1)
```

```
bit1 = bitget(j, 1);
bit2 = bitget(j, 2);
bit3 = bitget(j, 3);
bit4 = bitget(j, 4);
bit5 = bitget(j, 5);
bit6 = bitget(j, 6);
bit7 = bitget(j, 7);

location = 2^6*bit1 + 2^5*bit2 + 2^4*bit3 + 2^3*bit4 + 2^2*bit5 + 2*bit6 + bit7;
result(location+1) = had_res7(j+1);
tran_den_out(location+1) = tran_den_7(j+1);
end
```

A - 10

```
function [nibble, lsb, msb, tran_den] = nibble_calc(data)
%nibble calculator
%input 64 bytes
%output:
%       nibble: disparity of each 4 bits, 128 nibbles
%       lsb: least significant bit of individual byte
%       msb: most significant bit of individual byte
%       tran_density: flag indicating if there is a transition in particular byte %input is 64 bytes
for (i=1:64)
    for (j=1:8)
        bits(j) = bitget(data(i), j);
    end %assign transition density flag
    tran_den(2*(i-1)+1) = 0;
    tran_den(2*i) = 0;
    for (j=2:4)
        if(bits(j) ~= bits(j-1))
            tran_den(2*(i-1)+1) = 1;
        end
        if(bits(j+4) ~= bits(4 + j-1))
            tran_den(2*i) = 1;
        end
    end %LSB and MSB of current byte
    lsb(2*(i-1)+1) = bits(1);
    msb(2*(i-1)+1) = bits(4);
    lsb(2*i) = bits(5);
    msb(2*i) = bits(8);
```

A-11

```
%compute nibble disparity
nibble(2*(i-1)+1) = 0;
nibble(2*i) = 0;
%counting the disparity of the code
%two
for (j=1:4)
    if (bits(j) == 1)
        nibble(2*(i-1)+1) = nibble(2*(i-1)+1) + 1;
    end
    if (bits(j+4) == 1)
        nibble(2*i) = nibble(2*i) + 1;
    end
end
```

A - 12

```
function [tr_out1, tr_out2, lsb_out1, msb_out1, lsb_out2, msb_out2] =
tran_den_check(tr_in1, tr_in2,...
           lsb_in1, msb_in1,lsb_in2, msb_in2, flag)
% transition density calculator at each step of hadamard transform
% tran_den_in is transition density from previous step with two values
% lsb and msb of each input
% calculate new tran_den and lsb and msb
if (tr_in1 & tr_in2)%nibbles case
   tr_out1 = 1; %next flag is OK for uninverted
   tr_out2 = 1; %next flag is OK for inverted
   %msb of first not equal to lsb of first we have a transition for uninverted
elseif ((tr_in1 | tr_in2) & (flag == 1)) %nibbles case
   tr_out1 = 1; %next flag is OK for uninverted
   tr_out2 = 1; %next flag is OK for inverted
   %msb of first not equal to lsb of first we have a transition for uninverted
elseif ((msb_in1 ~= lsb_in2) & ((flag == 2) | (flag == 1))) %msb_in1 == lsb_in2
   tr_out1 = 1; %next flag is OK for uninverted
   tr_out2 = 0; %next flag is zero for inverted
elseif ((msb_in1 == lsb_in2) & ((flag == 2) | (flag == 1)))
   tr_out1 = 0; %next flag is OK for uninverted
   tr_out2 = 1; %next flag is zero for inverted
else
   tr_out1 = 0;
   tr_out2 = 0;
end
%assignment of lsb and msb of output
lsb_out1 = lsb_in1;
msb_out1 = msb_in2;
lsb_out2 = lsb_in1;
msb_out2 = ~msb_in2;
```

We claim:

1. A data encoding apparatus comprising:
   at least one disparity counter adaptable to calculate the disparity for a group of data bits; and
   a Hadamard Transform connected to said disparity counter and adaptable to generate possible disparity values from said disparity calculation provided by said disparity counter, wherein a minimum disparity value for said group of data bits is determined.

2. The data encoding apparatus of claim 1, wherein said disparity counter further comprises determining whether sufficient transition density exists for said group of data bits, wherein said Hadamard Transform determines whether said disparity values have sufficient transition density by evaluating transition density data provided by said disparity counter.

3. The data encoding apparatus of claim 1, wherein said Hadamard Transform comprises a Fast Hadamard Transform.

4. The data encoding apparatus of claim 1, wherein said group of data bits comprises one or more nibbles.

5. The data encoding apparatus of claim 1, wherein additional data bits having zero disparity and sufficient transition density are combined with said group of data bits to provide a data frame corresponding to a power of two.

6. The data encoding apparatus of claim 1, wherein said Hadamard Transform can be expressed by the equation $$h(k, n) = (-1)^{\Sigma_i k_i n_i}.$$

7. The data encoding apparatus of claim 1, wherein said disparity counter further provides least and most significant bits, of said group of data bits, which are used by said Hadamard Transform to determine if said disparity values have sufficient transition density.

8. The data encoding apparatus of claim 1, wherein said Hadamard Transform comprises a Fast Hadamard Transform comprised of at least one two-point Hadamard Transform.

9. The data encoding apparatus of claim 1, further comprising a minimum pattern selector connected to said Hadamard Transform and which selects the minimal disparity value, output by said Hadamard Transform, for said group of data bits.

10. The data encoding apparatus of claim 9, wherein said minimum pattern selector further comprises receiving disparity values for coding bits from a subsequent data encoder to combine with said minimal disparity values from said Hadamard Transform prior to selecting said minimal disparity value.

11. The data encoding apparatus of claim 9, further comprising an inversion vector generator connected to said minimum pattern selector and which generates the correct inversion pattern for the data output by said data encoding apparatus.

12. A method of encoding data, said method comprising:
    receiving a group of data bits;
    calculating the disparity for said group of data bits; and
    generating possible disparity values from said disparity calculation by employing a Walsh-Hadamard Transform to determine a minimum disparity value for said group of data bits.

13. The method of claim 12, further comprising calculating transition density for said group of data bits, said Walsh-Hadamard Transform determining whether said disparity values have sufficient transition density by evaluating said calculated transition density.

14. The method of claim 12, wherein said generating step further comprises employing at least one Fast Hadamard Transform.

15. The method of claim 12, further comprising dividing said group of data bits into nibbles.

16. The method of claim 12, further comprising combining said group of data bits with additional data bits having zero disparity and sufficient transition density to provide a data frame corresponding to a power of two or three times a power of two.

17. The method of claim 12, further comprising providing least and most significant bits from said group of data bits, said Walsh-Hadamard Transform determining whether said disparity values have sufficient transition density by evaluating said least and most significant bits.

18. The method of claim 12, further comprising selecting an output from said Walsh-Hadamard Transform having minimum disparity value for said group of data bits.

19. The method of claim 12, further comprising receiving disparity values for coding bits from a subsequent data encoder to combine with said minimal disparity values from said Walsh-Hadamard Transform prior to selecting said minimal disparity value.

20. The method of claim 12, further comprising calculating an inversion pattern for an output from said Walsh-Hadamard Transform to encode said group of data bits.

21. A disparity and transition density control device comprising:
    a disparity and transition density counter adapted to receive successive bytes of data and calculate the disparity for each said byte of data;
    a shift register adapted to also receive said successive bytes of data;
    a Fast Hadamard Transform coupled to said disparity and transition density counter and adapted to generate disparity values from said disparity calculations;
    a minimum pattern selector coupled to said Fast Hadamard Transform and adapted to select the minimal disparity value from said disparity values generated by said Fast Hadamard Transform; and
    an inversion vector generator coupled to said minimum pattern selector and adapted to generate the correct inversion pattern for said successive bytes of data output from said shift register.

22. The device of claim 21, wherein said Fast Hadamard Transform is further adapted to determine whether said disparity values have sufficient transition density by evaluating transition density data provided by said disparity and transition density counter.

23. The device of claim 21, wherein said Fast Hadamard Transform comprises a plurality of two-point Fast Hadamard transforms arranged in consecutive stages.

24. The device of claim 23, wherein each stage generates $2^{(stage\ number+1)}$ values which can be rearranged prior to providing the values to the following stage.

* * * * *